United States Patent [19]
Maciulewicz

[11] Patent Number: 5,570,586
[45] Date of Patent: Nov. 5, 1996

[54] INTERFACE CIRCUIT FOR USE IN MULTI-SPLIT AIR CONDITIONING SYSTEMS

[75] Inventor: Stephen M. Maciulewicz, Auburn, N.Y.

[73] Assignee: Carrier Corporation, Syracuse, N.Y.

[21] Appl. No.: 438,773

[22] Filed: May 11, 1995

[51] Int. Cl.⁶ .................................................. F25B 49/02
[52] U.S. Cl. .................. 62/175; 62/298; 236/51; 340/870.17
[58] Field of Search ............... 62/175, 298, 203; 236/51; 165/22; 340/870.17, 870.27, 870.39, 585; 327/50, 52, 56, 77, 89, 104, 308

[56] References Cited

U.S. PATENT DOCUMENTS

| | | |
|---|---|---|
| 4,643,002 | 2/1987 | Dennis et al. ................... 62/525 |
| 4,763,485 | 8/1988 | Sparks ......................... 62/298 X |
| 4,829,779 | 5/1989 | Munson et al. ................. 62/175 |
| 5,039,009 | 8/1991 | Baldwin et al. ................. 236/51 |
| 5,237,826 | 8/1993 | Baldwin et al. ............... 62/298 X |
| 5,247,805 | 9/1993 | Dennis .......................... 62/184 |

Primary Examiner—Harry B. Tanner

[57] ABSTRACT

An interface circuit for producing a single DC control voltage in response to any one of a plurality of different AC control voltages. The interface circuit includes a plurality of AC inputs for receiving different respective AC control voltages and a DC output. A comparator controls the voltage at the DC output in accordance with a reference voltage and a DC control voltage. An AC to DC converter includes a scaling network which generates the same DC control voltage without reference to which one of the AC inputs is receiving its respective AC control voltage.

14 Claims, 2 Drawing Sheets

INTERFACE CIRCUIT FOR USE IN MULTI-SPLIT AIR CONDITIONING SYSTEMS

BACKGROUND OF THE INVENTION

The present invention relates generally to multi-split air conditioning systems, and is directed more particularly to an improved interface circuit for use in such systems.

A typical air conditioning system includes an indoor unit having an evaporator coil, a fan and a control circuit for turning the fan on and off in accordance with the temperature of the indoor space being conditioned. This indoor unit operates in conjunction with an outdoor unit including a compressor, a condenser, a fan and a control circuit for turning one or more of the latter on and off in accordance with the cooling requirements of the indoor unit. These cooling requirements are typically communicated from the indoor unit to the outdoor unit over a pair of control wires which transmit a control voltage produced by the indoor unit. This control voltage is derived from the AC source which drives the fan, and is transmitted as a result of the closure of a contact by the indoor control circuit.

In air conditioning systems which include only a single indoor unit and a single outdoor unit, the communication of control signals from the former to the latter is clear and unambiguous. The presence or absence of a control voltage conveys all of the information necessary to control the outdoor unit.

A more complex control situation exists in multi-split air conditioning systems which include a plurality of identical indoor units and a single outdoor unit with multiple control inputs. In such systems, the condenser and fan of the outdoor unit may be controlled in accordance with the total number of indoor units which are transmitting control signals thereto, without taking into account which control input of the outdoor unit is receiving which control signal.

A much more complex control situation exists in multi-split air conditioning systems which include a plurality of non-identical indoor units and a single outdoor unit. In such systems, the indoor units have different fan power requirements and, consequently, operate on AC voltages having different magnitudes. A small indoor unit, for example, may use an AC voltage as low as 24 volts, while larger indoor units may use 115 volts single phase. Still larger units may use 230 volts three phase in either a Wye or a Delta configuration. As a result, unless the control scheme of the system is to be changed to fit each user's application, the outdoor unit must be able to operate with control signals having any one of a plurality of different control voltage values. Thus, prior to the present invention, there has existed a need for a simple, cost effective way of enabling the control circuitry of outdoor units to accept control voltages of any of a variety of different magnitudes.

SUMMARY OF THE INVENTION

In accordance with the present invention, there is provided circuitry which solves the above-described problem. More particularly, the present invention provides interface circuitry which allows the control circuitry of indoor units to transmit control voltages having a number of different magnitudes, and yet which causes the control circuitry of the outdoor unit to provided with control voltages which are of a single type and have the same magnitude. As a result, the air conditioning system is able to serve a plurality of indoor units of different sizes without modifying the basic control circuitry used by the indoor and outdoor units or the types of control signals transmitted therebetween.

Generally speaking, the interface of the invention comprises an array or bank of interface circuits each of which has a plurality of AC inputs for receiving different respective AC control voltages, an AC to DC converter, a comparator, and a DC input for receiving a DC reference voltage. Advantageously, the AC to DC converter includes voltage scaling circuitry which produces a single, standardized DC output voltage when any of the AC inputs of the interface circuit receives the AC voltage associated therewith, without regard to which of the inputs is receiving that voltage. The generation of this standardized or normalized DC voltage allows the comparator to perform a comparison against a single DC reference voltage and thereby determine that one of the control voltages is present, without regard to which control voltage it is. As a result, the comparator is able to transmit to the control circuit of the outdoor unit a control signal indicating that a particular indoor unit is on, without regard to the magnitude of the control voltage used by that indoor unit. In this way both the indoor units and the outdoor unit continue to send or receive control signals of the type for which they were designed, unaffected by the fact that a variety of different control voltage magnitudes are being used.

One particularly advantageous result of using a AC to DC converter which produces a single output DC voltage with a comparator which uses a single DC reference voltage is an improvement in the noise immunity of the control circuitry of the air conditioning system. This improvement in noise immunity results from the fact that the reference voltage serves as a threshold which prevents non-significant fluctuations in the AC control voltages from changing the state of the comparator and thereby providing erroneous signal information to the outdoor unit. The use of a single DC control voltage in all interface circuits assures that this improvement in noise immunity is provided for each control input of the outdoor control circuitry, without regard to the magnitude of the AC control voltage used by the indoor unit associated with that control input.

DESCRIPTION OF THE DRAWINGS

Other objects and advantages of the invention will be apparent from the following description and drawings, in which.

DESCRIPTION OF THE PREFERRED EMBODIMENTS

Figure 1:
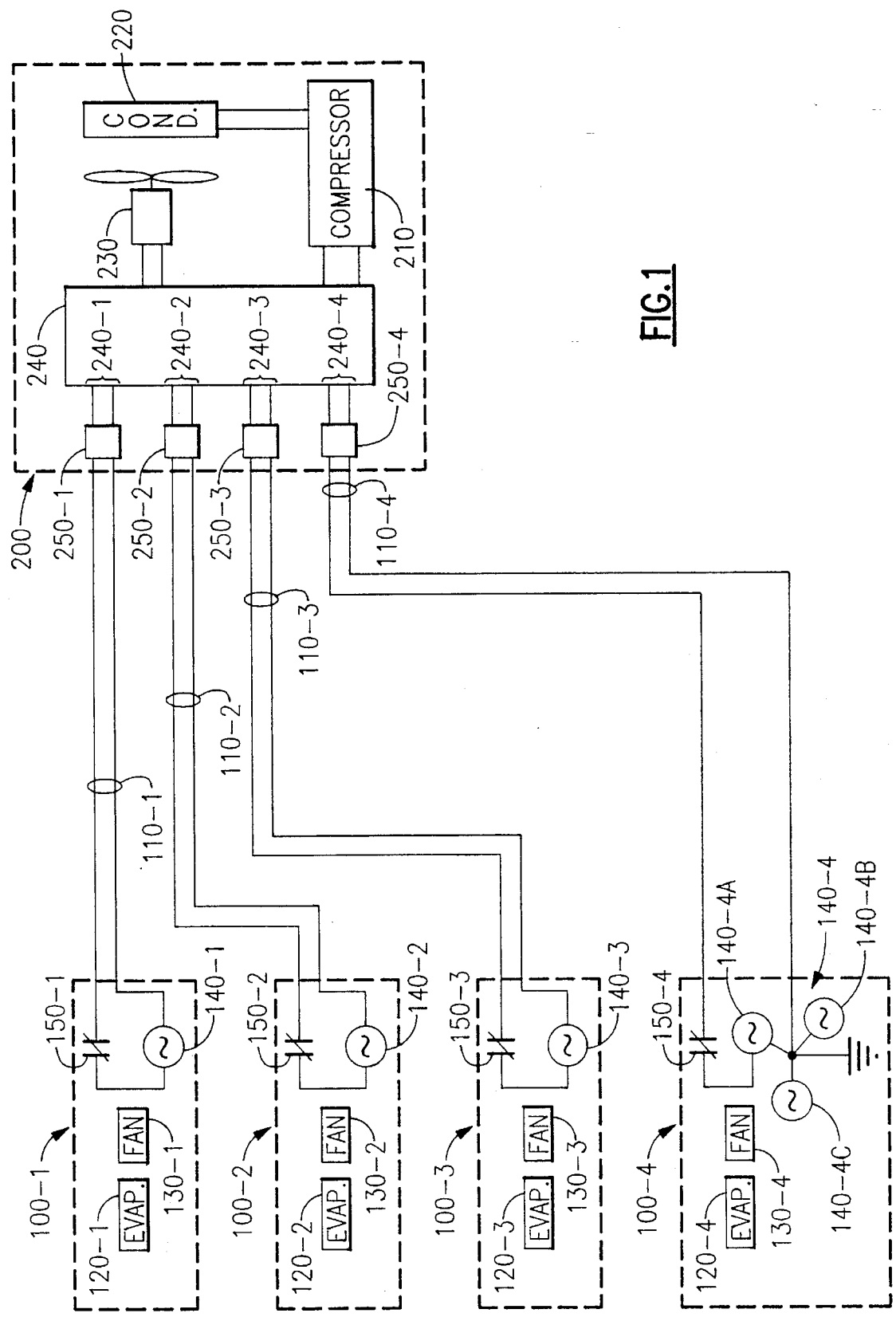
FIG. 1 is a simplified block diagram of a multi-split air conditioning system including interface circuitry constructed in accordance with the invention.

Referring to FIG. 1, there is shown a simplified block diagram of a multi-split air conditioning system that has been equipped with one embodiment of the interface circuitry of the invention. This air conditioning system includes a plurality of indoor air conditioning units 100-1, 100-2, 100-3 and 100-4, which will ordinarily be located in different respective parts of a single building, and an outdoor air conditioning unit 200 which will ordinarily be located adjacent to or on that building. Outdoor unit 200 serves to supply refrigerant to each of the indoor units via refrigerant supply and return lines (not shown) in accordance with control signals generated by the indoor units and transmitted to the outdoor unit over respective sets of control lines 110-1 through 110-4. These control signals inform outdoor unit 200 which indoor units are operating and cause the outdoor unit to supply refrigerant to those units when and in the amounts required thereby.

Generally speaking, outdoor unit 200 includes a compressor 210, a condenser 220, a condenser cooling fan 230, a plurality of refrigerant lines and solenoid actuated valves (not shown) and a control circuit 240 for controlling and coordinating the operation thereof. Control circuit 240 turns compressor 210 on and off as necessary to maintain an adequate supply of compressed refrigerant to condenser 220. Control circuit 240 also turns fan 230 on and off as necessary to remove the heat released by the refrigerant as it condenses within condenser 220. These activities are controlled in part by the control signals which are applied to the control inputs 240-1 through 240-4 thereof via control lines 110-1 through 110-4, respectively.

Generally speaking, each indoor unit includes an evaporator coil 120, a fan 130, an AC source 140 and a control circuit (not shown) for controlling the operation thereof in accordance with the temperature of the respective indoor zone. When the thermostat of the indoor zone indicates that cooling is called for, the control circuit turns on the fan by connecting the AC source thereto, thereby increasing the rate at which heat is absorbed by the evaporator coil. At the same time the control circuit closes a contact 150, causing the voltage of the AC source to be applied as a control voltage to the outdoor unit over a respective one of control lines 110-1 through 110-4. As previously explained, this causes the outdoor unit to supply refrigerant to the indoor zone and, if necessary, turn on the compressor and outdoor fan.

Since the indoor zones will in general have different cooling requirements, they will also in general have evaporator coils and fans of different sizes and will, consequently, utilize AC voltages having different magnitudes. Small indoor zones, for example, may use an AC source 140 having a voltage of 24 volts single phase, while larger indoor zones may use an AC source having a voltage of 115 volts single phase. Very large indoor zones may use an AC source having a voltage of 115 or 230 volts three phase. As a result, the control voltages transmitted to the outdoor unit over control lines 110-1 through 110-4 may be as small as 24 volts or as high as 230 volts and may occur in any combination. This, in turn, gives rise to the earlier-described problem of operating the outdoor unit with any combination of control voltage magnitudes.

Figure 2:
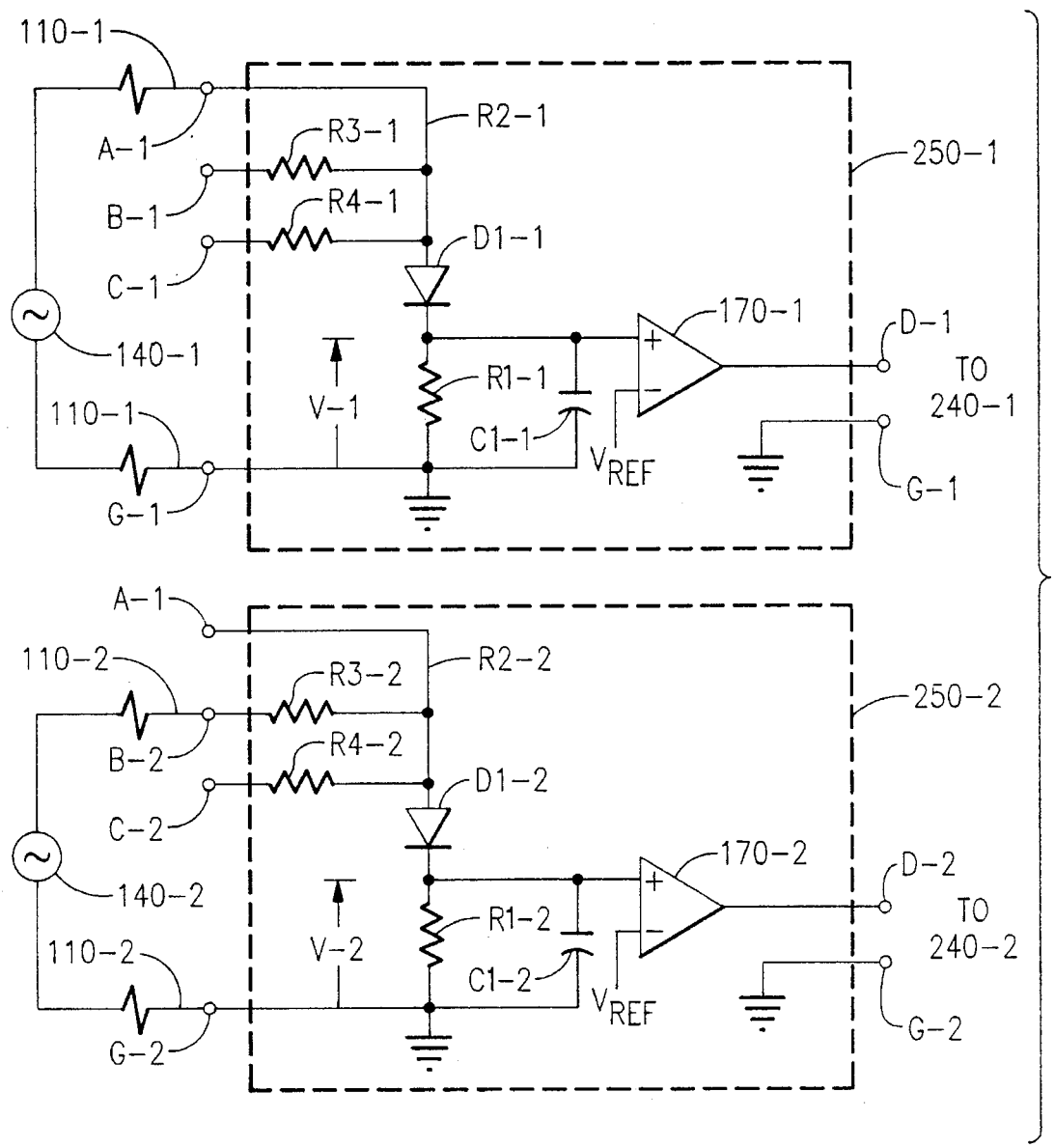
FIG. 2 is a schematic diagram of two of the interface circuits shown in FIG. 1.

In accordance with the present invention, this problem is solved by providing, between the control lines and the respective inputs of the control circuitry of the outdoor unit, a plurality of respective interface circuits 250-1 through 250-4, each of which is of the type shown in FIG. 2. As will be explained more fully presently, each of these interface circuits includes at least two sets of selectable AC inputs, a converter for converting the AC voltage at these inputs to a roughly normalized DC voltage and a comparator for comparing this normalized DC voltage to a DC reference voltage and outputting a standardized control signal to a respective input of the outdoor control circuitry. In so doing, the interface circuits communicate the fact that the respective indoor unit has been activated, independently of the magnitude of the AC control voltage that originally signalled that fact.

Referring to FIG. 2, there are shown two representative interface circuits 250-1 and 250-2 which are adapted for use with different respective AC control voltages. Each of these interface circuits includes a plurality of pairs of AC inputs and a single pair of DC outputs. Interface circuit 250-1, for example, includes first, second and third pairs of selectable AC input terminals G-1/A-1; G-1/B-1; and G-1/C-1, respectively, and a pair of DC output terminals G-1/D-1. Similarly, interfacing circuit 250-2 includes three pairs of AC input terminals G-2/A-2; G-2/B-2; G-2/C-2 and a pair of DC output terminals G-2/D-2. The remaining interface circuits 250-3 and 250-4 (not shown) are similar and include similar numbers of inputs and outputs.

Each of these interface circuits also includes an AC to DC converter circuit having an input that is adapted to receive the AC control voltage at any one of its pairs of AC inputs and to convert that AC voltage to a roughly normalized DC voltage. The converter network of interface circuit 250-1, for example, includes a voltage scaling network which here takes the form of a multi-input voltage divider comprising a first, common resistor R1-1 and any one of second resistors R2-1, R3-1 or R4-1, a diode D1-1, and a smoothing capacitor C1-1. The relative magnitudes of the first and second resistors, and the AC inputs to which they are connected, are selected so that, when an AC control voltage is connected to the input associated with that voltage, roughly the same DC voltage V-1 appears across common resistor R1-1 and capacitor C1-1.

In the embodiment of FIG. 2, AC input G-1/A-1 is associated with an AC control voltage of 24 volts and produces normalized DC voltage V-1 when the resistance of resistor R2-1 is relatively low in relation to the resistance of resistor R1-1. (In FIG. 2, the cost of a resistor is saved by selecting resistor R1-1 so that voltage V-1 is produced when resistor R2-1 has a resistance of zero, i.e., is replaced by a length of wire.) Similarly, AC input G-1/B-1 is associated with an AC control voltage of 115 volts and produces normalized DC voltage V-1 when the resistance of resistors R3-1 and R1-1 form an appropriate ratio. Third AC input G-1/C-1 and third resistor R4-1 may be used in similar manner to cause a third AC control voltage, such as 230 volts, to produce the desired normalized DC voltage V-1.

The number of inputs in each interface network will in general be equal to the number of different AC control voltages used in the system, and will be the same for all interface circuits. This allows all interface circuits to be alike and to be used interchangeably. The installer of the system need only know which interface inputs are associated with which control voltages and connect the control line for that voltage to that input. The output of each interface circuit should, however, be connected to a control input that controls a refrigerant line and solenoid suitable for use with the indoor zone that originated the control voltage.

To the end that the normalized DC voltage produced by the above-described AC to DC converter circuits may be converted to a two-state control signal with a high signal-to-noise ratio, each of the interface circuits of the invention includes a comparator, such as 170-1 and 170-2, having one input connected to receive a DC reference voltage Vref. In operation, each comparator serves to maintain the DC voltage at the respective output, G-1/D-1 or G-2/D-2, at a predetermined value so long as the voltage at the (+) input thereof is greater than the voltage Vref at the (−) input thereof. This, together with the smoothing effect of capacitor C1-1, assures that the DC output voltages of the interface circuits are unaffected by insignificant changes in the magnitudes of the AC control voltages applied thereto, and yet accurately reflect significant changes in the magnitudes of those voltages.

One significant secondary advantage of controlling the comparators with a voltage such as V-1 which has a single normalized value is that doing so allows the reference voltages applied to the comparators to also have a single value. This, in turn, allows the switching thresholds of all of the comparators to be changed by changing a single voltage. In addition, the use of a single normalized DC voltage and a single reference voltage causes the control voltages of all indoor units to have the same signal to noise ratio. As a result, the control characteristics of all indoor units are similar without regard to the differing AC voltages used thereby.

While this invention has been explained with reference to the structure disclosed herein, it is not confined to the details set forth and this application is intended to cover any modifications and changes as may come within the scope of the following claims:

What is claimed is:

1. An interface circuit for generating a DC output signal in response to any one of a plurality of different AC control voltages, including, in combination:
    at least two AC inputs for connection to different respective AC control voltages, and a DC output;
    a comparator having an output connected to said DC output, said comparator having a reference input for receiving a DC reference voltage and a control input;
    rectifying means for converting the AC control voltage at any of said inputs to a DC voltage;
    a voltage scaling circuit connected to said AC inputs and to said rectifying means for causing the voltage at said control input to have roughly the same magnitude without regard to which of said AC inputs is receiving the respective AC control voltage.

2. An interface circuit as set forth in claim 1 in which said voltage scaling circuit comprises a voltage divider having a first resistance connected to said control input, a plurality of second resistances each having a first end connected to respective ones of said AC inputs and a second end, and means for connecting the second ends of said second resistances to said control input.

3. An interface circuit as set forth in claim 2 in which said connecting means includes said rectifying means.

4. An interface circuit as set forth in claim 2 further including a capacitor connected across said first resistance.

5. An interface circuit as set forth in claim 1 in which said voltage scaling circuit includes a first section connected to said AC inputs, and a second section connected to said control input, and in which said rectifying means is connected between the first and second sections of said scaling circuit.

6. An interface circuit for generating a DC output signal in response to any one of a plurality of different AC control voltages including, in combination:
    at least two AC inputs for receiving different respective AC control voltages, and a DC output;
    a comparator having an output connected to said DC output, said comparator having a reference input for receiving a DC reference voltage and a control input;
    an AC to DC converter for applying a roughly normalized DC voltage to said control input when any one of said AC inputs is connected to its respective AC control voltage, said AC to DC converter having a plurality of inputs connected to respective ones of said AC inputs.

7. An interface circuit as set forth in claim 6 in which said AC to DC converter comprises a voltage divider having a first resistor connected to said control input, a plurality of second resistors each having one end connected to respective ones of said AC inputs, and a rectifying element for connecting the other ends of said second resistors to said first resistor.

8. An interface circuit as set forth in claim 7 in which one of said second resistors has a resistance substantially equal to zero.

9. An interface circuit as set forth in claim 7 in which said rectifying element comprises a diode.

10. An interface circuit as set forth in claim 9 further including a smoothing capacitor connected across said first resistor.

11. In an air conditioning system for conditioning the air in a plurality of indoor zones, said system being of the type having a plurality of indoor units each including an evaporator, a fan and an AC source, an outdoor unit including a compressor, a condenser, a fan and control circuitry for controlling said compressor and fan in accordance with AC control signals produced by said indoor units, and a plurality of control lines for transmitting said control signals from respective indoor units to respective inputs of said control circuitry, the improvement comprising:
    a plurality of interface circuits connected between respective ones of said control lines and respective inputs of said control circuitry, each of said interface circuits including:
    at least two AC inputs adapted to be connected to receive different respective AC control voltages, and a DC output;
    comparing means for applying a two-state DC voltage to said DC output, said comparing means having a reference input for receiving a DC reference voltage and a control input;
    rectifying means for converting the AC control voltage at any of said inputs to a DC voltage and applying said DC voltage to said control input; and
    voltage scaling means connected to said inputs and to said rectifying means for assuring that the DC voltage produced by said rectifying means has roughly the same magnitude without regard to which of said AC inputs is receiving its respective AC control voltage.

12. The air conditioning system of claim 11 in which the scaling means comprises a voltage divider having a first resistor connected to the control input of said comparing means, a plurality of second resistors, each having a first end connected to respective ones of said AC inputs and a second end, and in which said rectifying means connects the second ends of the second resistors to the control input of said comparing means.

13. The air conditioning system of claim 12 further including a capacitor connected across said first resistor.

14. The air conditioning system of claim 11 in which said voltage scaling means includes a first section connected to said AC inputs, and a second section connected to the control input of said comparing means, and in which said rectifying means is located between the first and second sections of said scaling means.

\* \* \* \* \*